June 20, 1939. A. A. OEDING 2,162,786
DECOY DUCK
Filed July 3, 1937

INVENTOR
Anthony A. Oeding
BY
ATTORNEY

Patented June 20, 1939

2,162,786

UNITED STATES PATENT OFFICE 2,162,786

DECOY DUCK

Anthony A. Oeding, Ferguson, Mo.

Application July 3, 1937, Serial No. 151,792

9 Claims. (Cl. 43—3)

This invention relates in general to game-lures and, more particularly, to a certain new and useful improvement in lures of the type known as decoy ducks.

My invention has for its primary object the provision of a decoy duck of unique form and inexpensive, durable structure, which is non-sinkable and non-capsizable, and which is so constructed as to automatically, when in use, move over the surface of the water in a manner remarkably similar to the movement of a live duck, thereby adding to the effectiveness of the decoy in the performance of its intended functions.

And with the above and other objects in view, my invention resides in the novel features of form, construction, arrangement, and combination of parts presently described and pointed out in the claims.

In the accompanying drawing,—

Figure 1:
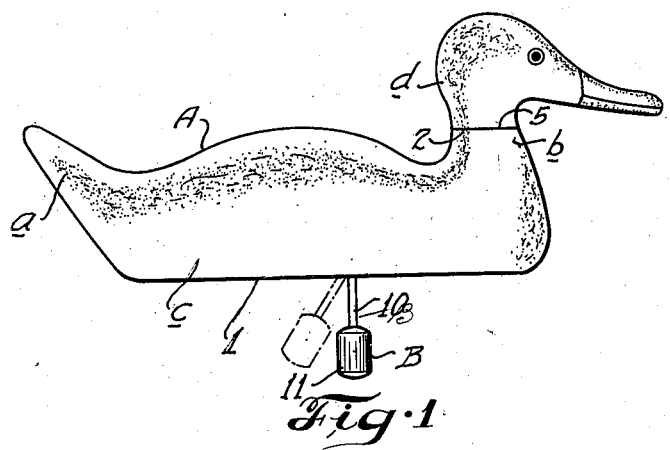
Figure 1 is a side elevational view of a decoy duck constructed in accordance with and embodying my present invention.

Referring now in more detail and by reference characters to the drawing, which illustrates a preferred embodiment of the present invention, the decoy A is preferably, though not necessarily, molded from a suitable buoyant material, such, for instance, as composite ground cork or the like, and has the shape or contour and coloring in general resemblance and imitation of the body of a natural live duck, the decoy A including, preferably as an integral unit, a tail-simulative portion $a$, a neck-simulative portion $b$, and an intermediate body-simulative portion $c$, which latter portion is flattened on its under face, as at 1, and the decoy thus provided with a floating or "riding" surface, lending greater stability to the duck in actual use on the water.

Figure 2:
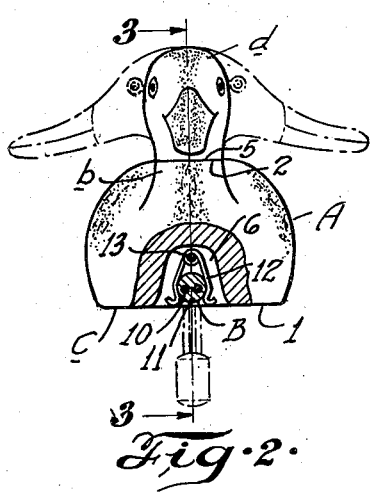
Figure 2 is a front elevational view of the duck, partly broken away and in section.

The neck-portion $b$ is formed with a flat upwardly presented face 2 having a centrally disposed downwardly extending cylindrical socket 3 for rotatively receiving a dowel 4 embedded or otherwise fixed at its upper extremity in a head-simulative portion $d$ likewise molded or otherwise formed of suitable buoyant material and shaped in the formation of a smooth continuation of the contour of the neck-portion $b$, thereby completing the duck imitation assembly, the head $d$ having a flat under face 5 for precisely matching or registering with, and for flatwise seating movably upon, the face 2. Thus the head-portion $d$ may be conveniently turned or swivelled into various relative positions, as shown and as indicated in dot-dash lines in Figure 2.

Formed approximately centrally in the body-portion $c$ and opening upon the flat under face 1, is a relatively deep recess 6 having communication at an end with a shallow forward-continuation 6'. Fixed, as by means of a screw or other suitable securing member 7, within the shallow recess-continuation 6' and disposed preferably forwardly of the center of gravity of the duck A, is a U-shaped bracket 8 provided with a transversely extending pin 9, pivotally suspended from which for oscillation is a pendulum B comprising a stem or rod 10 and a "bob" or weight 11 of lead or other suitable material.

Figure 3:
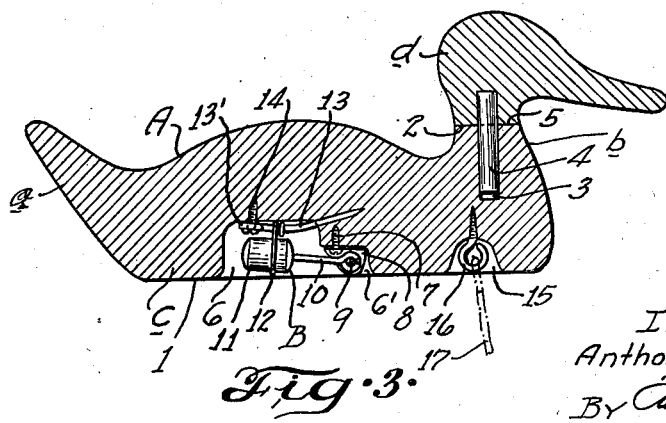
Figure 3 is a vertical longitudinal sectional view of the duck, taken approximately along the line 3—3, Figure 2.

Normally the pendulum B will depend swingably from the pivot-pin 9, as best seen in Figure 1, and yet may abnormally be swung backwardly and upwardly for disposition entirely within the main recess 6, in which latter position the pendulum B is releasably held by means of a V-shaped spring clip 12 shiftably mounted at its bight upon an approximately horizontal wire bar 13 provided at its rear end with a loop or eye 13', the bar 13 being, in turn, embedded at its forward end in the duck-body $c$ and at its other end secured to the duck-body $c$ as by means of a screw or other suitable fastening-member 14 passed through the loop 13', all as best seen in Figure 3.

Fixed at its shank to the body $c$ and having an eye housed in a relatively small arcuate recess 15 formed in a forward end-portion, and opening to the under face 1 of the body $c$, is a screw-member 16 for connection with a suitable chain or cord 17 by which the duck A may be anchored.

In use, the pendulum B is released from the clip 12, whereupon the pendulum B may freely and automatically oscillate. The clip 12 is then shifted forwardly along the bar 13 out of pendulum engaging position should the bob 11 accidentally swing upwardly into the recess 6 during actual decoying use. The head $d$ is then set or disposed at any desired position as may suit the taste and inclinations of the user, and the anchor chain or cord 17 suitably attached in a conventional manner, whereupon the decoy duck A may be set afloat, the force of the wind and the waves or ripples of the water tending to capsize or upset the duck A being then met and overcome by the downward disposition of the bob 11. Further, as the duck A is rocked by the normal eddying and wave-motion of the water, the pendulum B will begin to swing to and fro in pendulum-wise fashion about a point forward of the center of gravity of the duck A, thereby setting up a reactionary force, causing the duck to progress forwardly at a relatively moderate steady speed in simulation of the actual movements of a live duck. At the end of a day's duck hunting, the user may readily swing the pendulum B to reside within the recess 6 under engagement by the then rearwardly shifted clip 12 and turn the head d backwardly over the duck-body c in compact position for convenient transportation.

Thus, by my present invention, I provide a decoy duck which is buoyant and light in weight and practically non-capsizable, which is realistic in appearance, and which is capable of automatic propulsion in simulation of the movements of a live duck without resort to noisy or artificial mechanism which would detract from its decoy or lure characteristics.

It should be understood that changes and modifications in the form, construction, arrangement, and combination of the several parts of the decoy duck may be made and substituted for those herein shown and described without departing from the nature and principle of my invention.

Having thus described my invention, what I claim and desire to secure by Letters Patent is,—

1. A buoyant decoy duck simulative in form of a natural duck, the duck comprising a body having a recess in its under face, and a pendulum pivotally mounted in the recess for horizontal disposition in its entirety in said recess when the duck is not in use and being swingable downwardly out of said recess into substantially vertical free-swinging position when the duck is in actual use.

2. A buoyant decoy duck simulative in form of a natural duck, the duck comprising a body having a flat under face provided with a recess, and a pendulum pivotally mounted in the recess upon a forward wall thereof for horizontal disposition in its entirety in said recess when the duck is not in use and being swingable downwardly out of said recess into substantially vertical free-swinging position when the duck is in actual use.

3. A buoyant decoy duck simulative in form of a natural duck, the duck comprising a body having a flat under face provided with a recess, a pendulum pivotally attached to the duck for normal oscillation under said face and for abnormal housing in said recess, and a spring-clip mounted in said recess for detachable engagement with the pendulum for releasably retaining the pendulum in housed position within said recess.

4. A buoyant decoy duck simulative in form of a natural duck, the duck comprising a body having a flat under face provided with a recess, a pendulum pivotally attached to the duck for normal oscillation under said face and for abnormal housing in said recess, and a spring-clip mounted for shiftable movement in the recess for selective detachable engagement with the pendulum for optionally retaining the pendulum in housed position within the recess.

5. A buoyant decoy duck simulative in form of a natural duck, and a stiff shafted pendulum pivotally attached at its end to the duck forwardly of the center of gravity of the duck for oscillation thereunder and being capable, during forward oscillation, of striking impingement, along a part of its shaft, with a relatively fixed portion of the duck for increasing the rocking and ambulatory movement thereof.

6. A buoyant decoy duck simulative in form of a natural duck, the duck comprising a body having a flat under face provided with a recess, a pendulum pivotally mounted in the recess upon a forward wall thereof for horizontal disposition in its entirety in said recess when the duck is not in use and being swingable downwardly out of said recess into substantially vertical free-swinging position when the duck is in actual use and having a pendulum-bob, and shiftable means engageable with the pendulum-bob for releasably securing the pendulum within said recess.

7. A buoyant decoy duck simulative in form of a natural duck, the duck comprising a body having a flat under face provided with a recess, a pendulum pivotally mounted in the recess upon a forward wall thereof for horizontal disposition in its entirety in said recess when the duck is not in use and being swingable downwardly out of said recess into substantially vertical free-swinging position when the duck is in actual use and having a pendulum-bob, and means engageable with the pendulum-bob for releasably securing the pendulum within said recess, said means being shiftable lengthwise of the recess into and out of operative position for bob-engagement whereby to permit the pendulum to swing into and out of the recess without restraint when the decoy duck is in actual use.

8. A buoyant decoy duck simulative in form of a natural duck, the duck comprising a body having a flat under face provided with a recess, and a pendulum pivotally mounted in the recess upon a forward wall thereof for horizontal disposition in its entirety in said recess when the duck is not in use and being swingable downwardly out of said recess into substantially vertical free-swinging position when the duck is in actual use, said pendulum being adapted to strike intermediate its ends against a portion of said body, thereby being limited in its forward swinging movement so that its total arc of swing is substantially less than 180° and produce increased rocking and ambulatory movement of the decoy duck.

9. A buoyant decoy duck simulative in form of a natural duck, the duck comprising a body having a flat under face provided with a recess, a pendulum pivotally mounted in the recess for horizontal disposition in its entirety in said recess when the duck is not in use and being swingable downwardly out of said recess into substantially vertical free swinging position, and means shiftably mounted in the recess and being adapted for retentive engagement with the pendulum-bob at a selected position.

ANTHONY A. OEDING.